(12) United States Patent  (10) Patent No.: US 6,622,823 B2
Engstrom  (45) Date of Patent: Sep. 23, 2003

(54) TREE CLIMBING APPARATUS

(75) Inventor: Jay C. Engstrom, Luck, WI (US)

(73) Assignee: Ardisam, Inc., Cumberland, WI (US)

( * ) Notice: Subject to any disclaimer, the term of this patent is extended or adjusted under 35 U.S.C. 154(b) by 0 days.

(21) Appl. No.: 10/042,785

(22) Filed: Jan. 9, 2002

(65) Prior Publication Data

US 2003/0127286 A1 Jul. 10, 2003

(51) Int. Cl.$^7$ ............................................. A63B 27/00
(52) U.S. Cl. ...................... 182/136; 182/135; 182/187
(58) Field of Search ................ 182/134, 135, 182/136, 187, 188; 108/152

(56) References Cited

U.S. PATENT DOCUMENTS

| | | | | | |
|---|---|---|---|---|---|
| 4,427,092 A | * | 1/1984 | Tentler | ........................ | 182/134 |
| 4,428,459 A | * | 1/1984 | Peck | ........................... | 182/187 |
| 4,640,212 A | * | 2/1987 | Brandt | ........................ | 114/230 |
| 4,802,552 A | * | 2/1989 | Williams | ..................... | 182/187 |
| 4,909,353 A | * | 3/1990 | Govin et al. | ................ | 182/187 |
| 5,097,925 A | | 3/1992 | Walker, Jr. | | |
| 5,101,934 A | * | 4/1992 | Zumbro | ....................... | 182/187 |
| 5,167,298 A | * | 12/1992 | Porter | ......................... | 182/187 |
| 5,492,198 A | * | 2/1996 | Williams | .................... | 182/136 |
| 5,641,036 A | * | 6/1997 | Maxwell | ..................... | 182/135 |
| 5,971,104 A | * | 10/1999 | Woller | ......................... | 182/136 |
| 6,182,792 B1 | * | 2/2001 | Woller et al. | ............... | 182/187 |
| 6,308,800 B1 | * | 10/2001 | Graham, Jr. | ................ | 182/136 |
| 6,397,973 B1 | * | 6/2002 | Woller | ......................... | 182/187 |

* cited by examiner

*Primary Examiner*—Bruce A. Lev
(74) *Attorney, Agent, or Firm*—Gerald E. Helget; Nelson R. Capes; Briggs and Morgan

(57) ABSTRACT

A tree climbing apparatus consisting of two movable platforms, each of which is secured to the tree trunk by a flexible strap that has a non-scratching cover that will not harm the bark of the tree. Each of the flexible straps has a construction that includes an elastic stiffener that causes the flexible strap to be self-straightening when one end of the flexible strap is removed from the platform.

18 Claims, 4 Drawing Sheets

TREE CLIMBING APPARATUS

BACKGROUND OF THE INVENTION

The present invention relates to a tree climbing apparatus for use in hunting, and in particular to a tree climbing apparatus which has non-scratching flexible straps that do not damage the bark of the tree.

There are presently a wide variety of climbing devices for trees and poles which are commercially available. All of these devices are attached and/or supported about the tree or pole by means of straps, rods, bars, or a combination thereof.

One such tree climbing apparatus is disclosed in U.S. Pat. No. 5,097,925. Although this patent purports to be an improvement over the prior art, it still has the disadvantage that it is attached to the tree or pole by a cable which will still scratch or cut the bark of the tree when being used.

There is a need for a tree climbing apparatus with a flexible strap that does not damage the bark of the tree.

SUMMARY OF THE INVENTION

A tree climbing apparatus comprising:
a) a first platform adapted to engage the tree trunk while the user is standing thereon, and movable along the tree trunk while the user is not standing thereon, the first platform having a first flexible strap removably attachable thereto, the first flexible strap having a non-scratching surface that does not scratch the tree trunk while in use; and
b) a second platform adapted to engage the tree trunk while the user is sitting thereon, and movable along the tree trunk while the user is not sitting thereon, the second platform having a second flexible strap removably attachable thereto, the second flexible strap having a non-scratching surface that does not scratch the tree trunk while in use.

A principle object and advantage of the present invention is that it is attached to the tree by a flexible strap that has a non-scratching cover that will not damage the trunk of the tree.

Another principle object and advantage of the present invention is that the flexible strap is self-straightening when one end of the flexible strap is removed from the apparatus. This assists the user in making adjustments to the flexible straps while the tree is being climbed.

DETAILED DESCRIPTION OF THE PREFERRED EMBODIMENT

Figure 1:
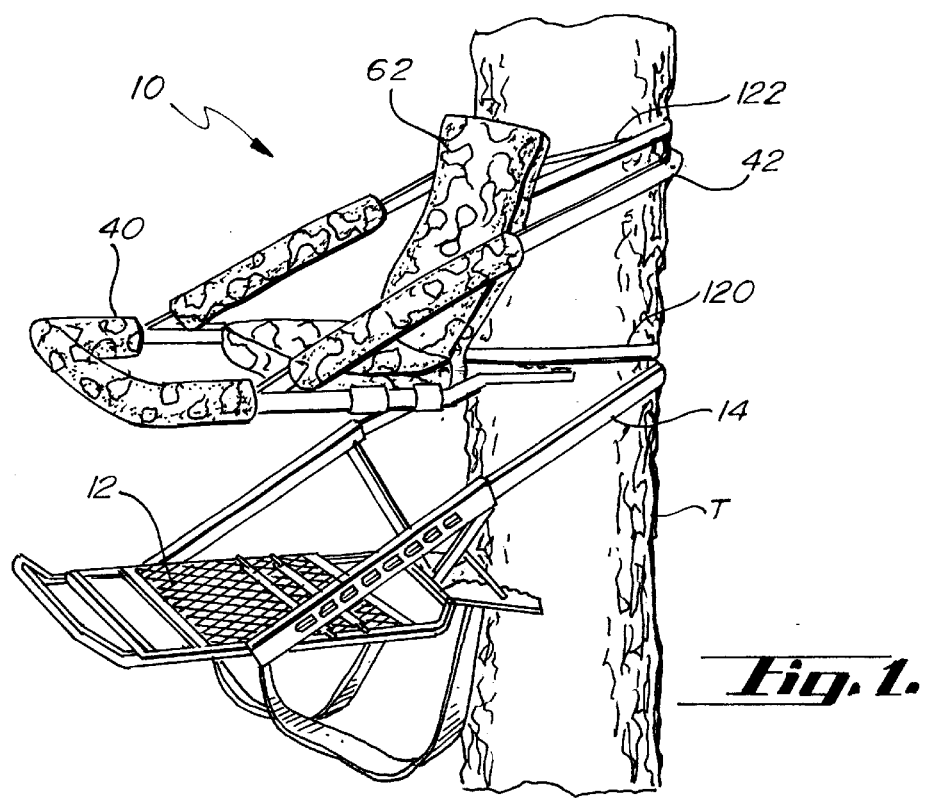
FIG. 1 is a perspective view of the present invention.
Figure 2:
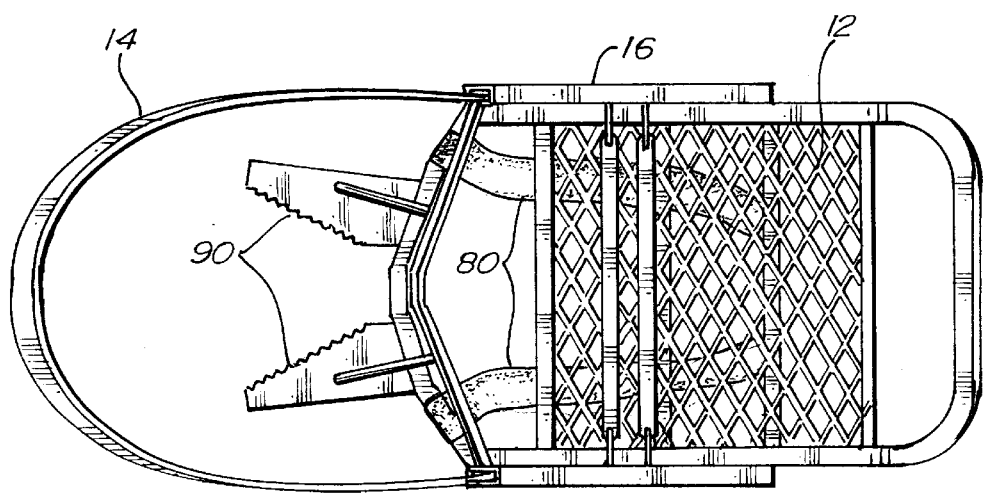
FIG. 2 is a top plan view of the lower platform of the present invention.

The tree climbing apparatus of the present invention is generally shown in the Figures as reference numeral 10.

Figure 10A:
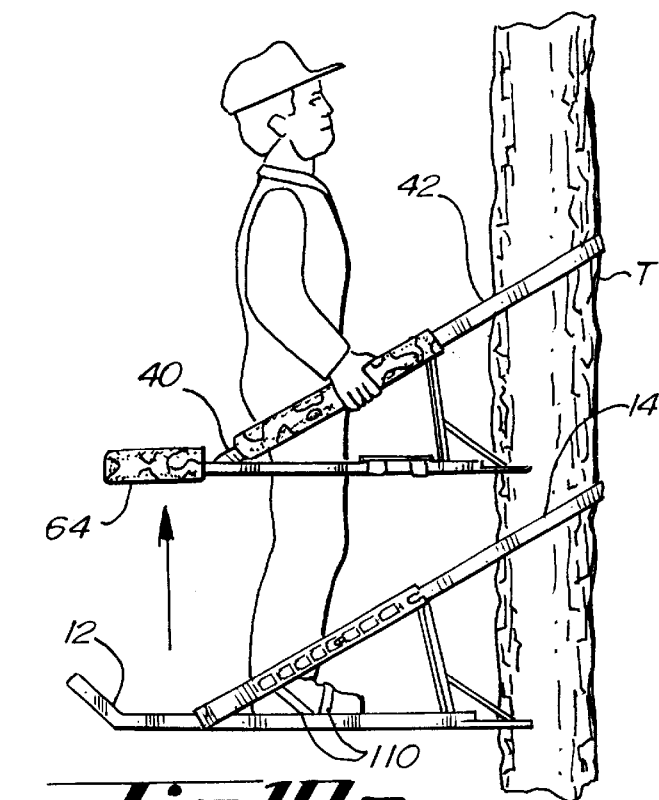
FIGS. 10a and 10b are elevational views showing the use of the present invention.
Figure 10B:
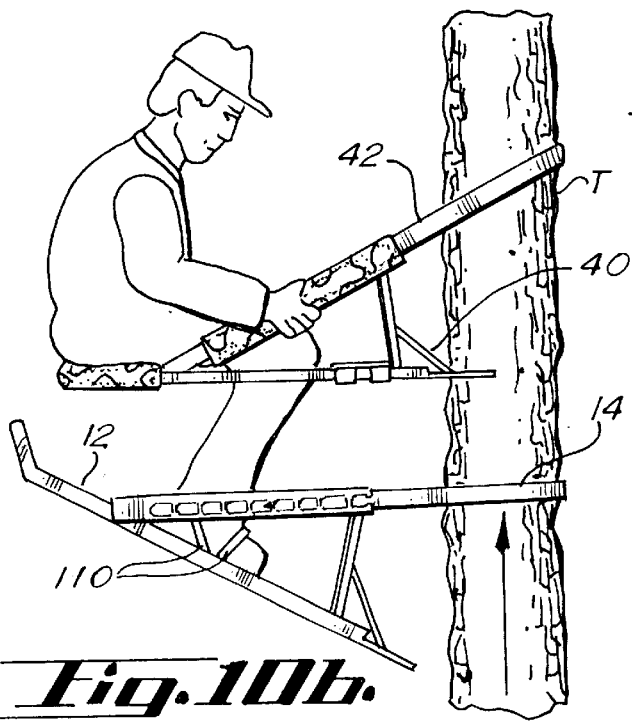

The tree climbing apparatus 10 further comprises a first platform 12 adapted to engage the trunk T of a tree while the user is standing on the first platform 12, as best seen in FIG. 10a. The first platform 12 is movable along the tree trunk T when the user is not standing on the first platform 12, as best seen in FIG. 10b.

The first platform 12 has a first flexible strap 14 removably attachable thereto. The first flexible strap 14 has a non-scratching surface 15 that does not scratch the tree trunk T while in use. Preferably, the non-scratching surface is made of a resilient material, most preferably rubber.

Figure 3:
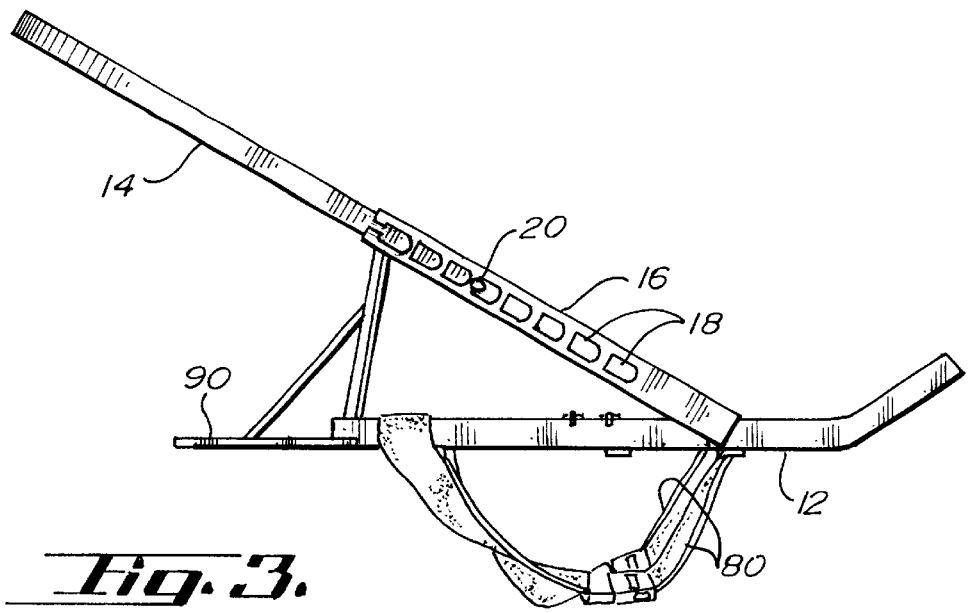
FIG. 3 is a side elevational view of the lower platform of the present invention.
Figure 4:
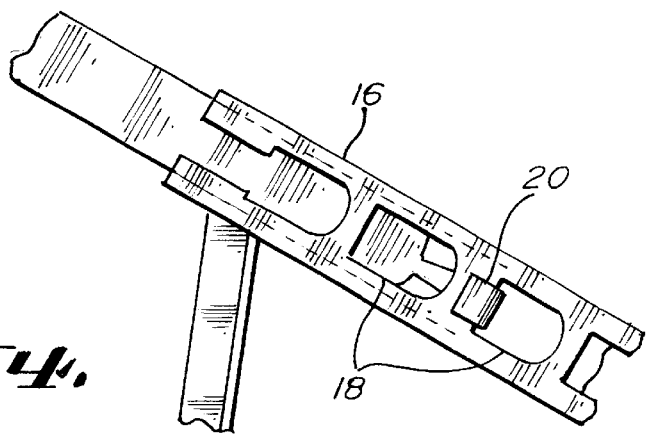
FIG. 4 is a detailed view of a support arm of the lower platform.

As seen in FIG. 3, the first platform 12 further comprises a pair of support arms 16 adapted to releasably engage each end of the first flexible strap 14. The support arms 16 preferably engage the first flexible strap 14 by means of a plurality of apertures 18 in the support arms 16, the first flexible strap having a spring clip 20 at each end which can be releasably attached to one of the plurality of apertures 18. In this manner, the first flexible strap 14 is adjustable to accommodate tree trunks T with varying diameter.

Preferably, the first flexible strap 14 is self-straightening when detached from the support arms 16. That is, the construction of the first flexible strap 14 is such that it resists being bent into a loop to be attached to the support arms 16, and when one end of the strap 14 is released from the support arms 16, the strap 14 straightens back to an unbent configuration. To accommodate this feature, the first flexible strap 14 preferably has an elastic stiffener 102 enclosed therein, as will be discussed in greater detail below.

The apparatus 10 further comprises a second platform 40 adapted to engage the tree trunk T while the user is sitting on the second platform 40, as best seen in FIG. 10b. When the user is not sitting on the second platform 40, the second platform 40 is movable along the tree trunk T, as in FIG. 10a.

The second platform 40 has a second flexible strap 42 removably attachable thereto. The second flexible strap 42 has a non-scratching surface 15 that does not scratch the tree trunk T while in use. Preferably, the non-scratching surface is made of a resilient material, most preferably rubber.

Figure 5:
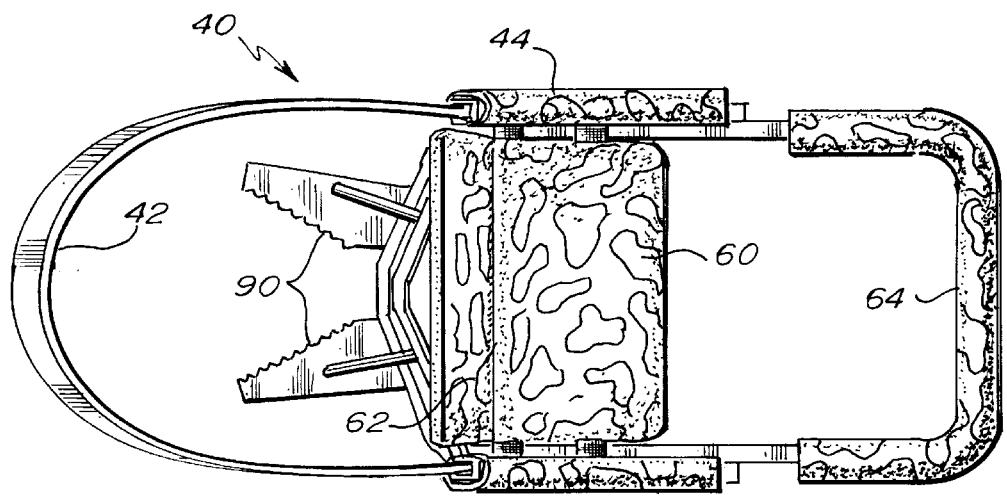
FIG. 5 is a top plan view of the upper platform of the present invention.
Figure 6:
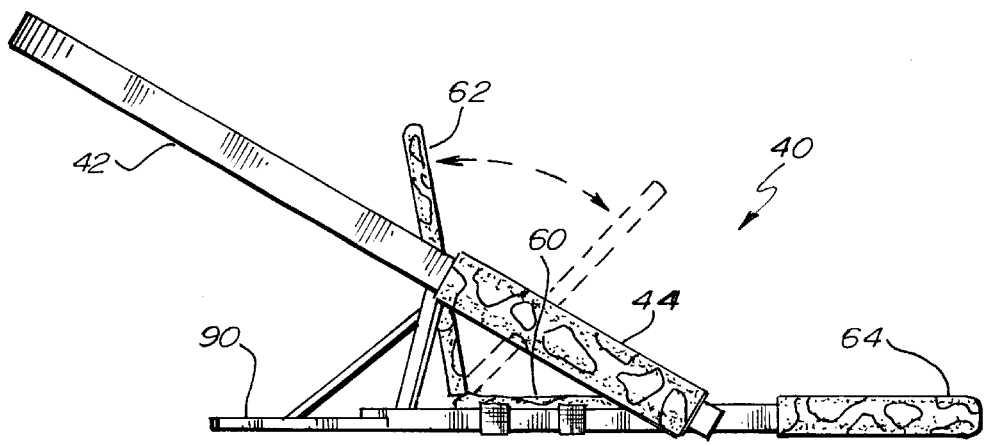
FIG. 6 is a side elevational view of the upper platform of the present invention.
Figure 7:
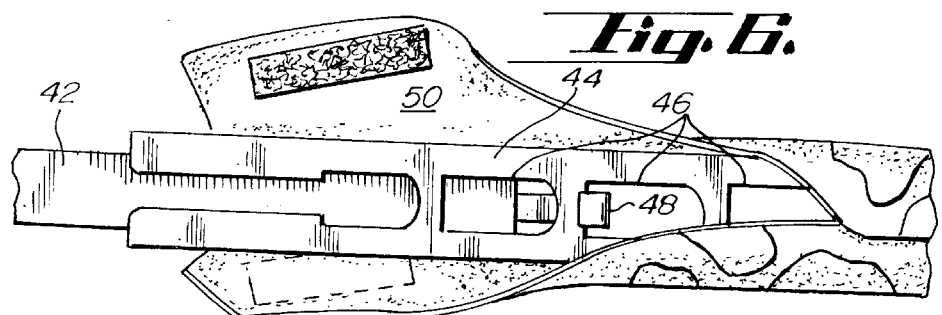
FIG. 7 is a detailed view of a support arm of the upper platform.

As seen in FIGS. 5–7, the second platform 40 further comprises a pair of support arms 44 adapted to releasably engage each end of the second flexible strap 42. The support arms 44 preferably engage the second flexible strap 42 by means of a plurality of apertures 46 in the support arms 44, the second flexible strap 42 having a spring clip 48 at each end which can be releasably attached to one of the plurality of apertures 46. In this manner, the second flexible strap 42 is adjustable to accommodate tree trunks T with varying diameter.

The support arms 44 may preferably be enclosed in a cover 50 both to prevent sunlight shining on the support arms 44 and to prevent any inadvertent noise caused by the hunter banging against the support arms 44. Preferably, the cover 50 is closable about the support arms 44 as by Velcro or other fastener.

Preferably, the second flexible strap 42 is self-straightening when detached from the support arms 44. That is, the construction of the second flexible strap 42 is such that it resists being bent into a loop to be attached to the support arms 44, and when one end of the strap 42 is released from the support arms 44, the strap 42 straightens back to an unbent configuration. To accommodate this feature, the second flexible strap 42 preferably has an elastic stiffener 102 enclosed therein, as will be discussed in greater detail below.

The second platform 40 further comprises a seat 60 and a movable backrest 62. A bench 64 is provided at the end of the second platform 40 distant from the tree trunk T.

Backpacking straps 80 (FIG. 7) may be attached either to the first platform 12 or to the second platform 40 for portability. The platforms 12, 40 may be bound together for transport, for example by a rope.

Figure 8:
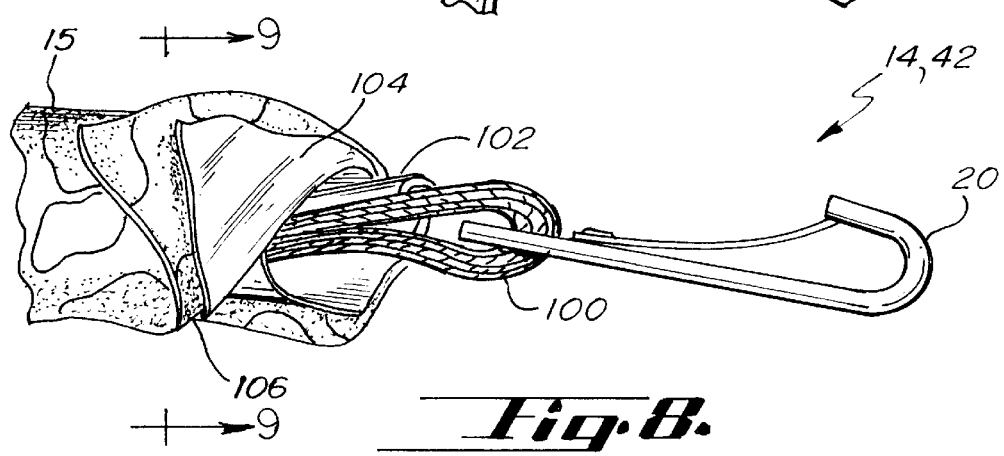
FIG. 8 is a detailed view of the components of the flexible straps of the present invention.
Figure 9:
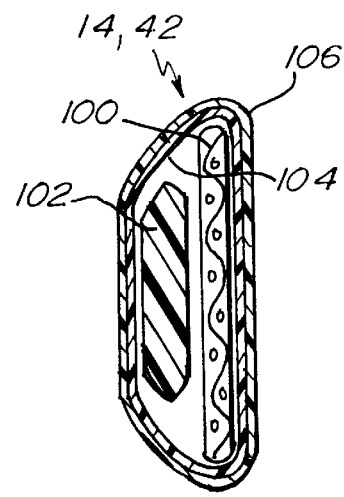
FIG. 9 is a cross-section along approximately the lines 9 of FIG. 8.

Construction details of the first flexible strap 14 and the second flexible strap 42 are shown in FIGS. 8 and 9. As can be seen the straps 14, 42 preferably comprise a tough, flexible inner strap 100; an elastic stiffener 102; an inner cover 104 enclosing the inner strap 100 and the elastic stiffener 102; and an outer cover 106 enclosing the inner cover 104. This combination of materials prevents the straps from being abraded by rough tree trunks and also allows the straps to be self-straightening.

Each platform 12, 40 has tree blades 90 for gripping the trunk T.

Boot straps 110 may be attached to the first platform 12 as shown in FIG. 10*b*.

A user climbs a tree trunk T using the apparatus 10 as follows. At ground level, the user takes both platforms 12, 40 and mounts them onto the tree trunk T with the straps 14, 42 as shown in FIG. 1. Each strap 14, 42 is inserted into the support arms 16, 44 and the straps 14, 42 are locked to the support arms 16, 44 by inserting the clips 20,48 into a desired aperture 18, 46.

Next, the user steps through the second platform 40 and stands on the platform 12 facing the tree as shown in FIG. 10*a*. The user attaches the boot straps 110 to his feet.

Standing on the first platform 12, the user raises the second platform 40 to a comfortable below chest height (FIG. 10*a*). The users pulls the second strap 42 into the tree trunk T and sits down on the bench 64, pushing the tree blades 90 into the tree trunk T.

Next (FIG. 10*b*), the user pushes his toes down to release the first platform 12 from the tree trunk T and raises the second platform 12 by raising his legs. At a comfortable sitting position, the user lifts up with his toes, pulling the tree strap 14 into the tree, then stands on the first platform 12 pushing the tree blades 90 into the trunk.

The user repeats the above steps until he reaches the desired height on the tree.

The user may then secure the second platform 40 to the trunk T using a cam strap 120 that can be tightened securely about the tree trunk T.

The back rest 62 is then moved against the tree trunk T for comfort. The back rest 62 may also be secured to the trunk T by another strap 122.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A tree climbing apparatus comprising:
    a) a first platform adapted to engage the tree trunk while the user is standing thereon, and movable along the tree trunk while the user is not standing thereon, the first platform having a first flexible strap removably attachable thereto, the first flexible strap having a non-scratching surface that does not scratch the tree trunk while in use;
    b) a second platform adapted to engage the tree trunk while the user is sitting thereon, and movable along the tree trunk while the user is not sitting thereon, the second platform having a second flexible strap removably attachable thereto, the second flexible strap having a non-scratching surface that does not scratch the tree trunk while in use;
    c) wherein the first flexible strap and the second flexible strap are self-straightening when removed from the apparatus;
    d) wherein the first flexible strap and the second flexible strap each further comprises an elastic stiffener adapted to straighten when the first flexible strap and the second flexible strap are removed from the apparatus;
    e) wherein the first platform further comprises a pair of support arms adapted to releasably engage each end of the first flexible strap; and
    f) wherein the support arms have a plurality of apertures and the first flexible strap has a spring clip at each end engaging a selected one of the plurality of apertures, thereby being adjustable for varying tree trunk diameters.

2. The apparatus of claim 1, wherein the user sits facing the tree while sitting on the second platform.

3. The apparatus of claim 1, wherein the first flexible strap and the second flexible strap are adjustable to accommodate tree trunks with varying diameter.

4. The apparatus of claim 1, wherein the surface of the first flexible strap and the surface of the second flexible strap are made of a resilient material.

5. The apparatus of claim 4, wherein the resilient material is rubber.

6. The apparatus of claim 1, wherein the first flexible strap and the second flexible strap each further comprises a tough, flexible inner strap; an elastic stiffener; an inner cover enclosing the flexible inner strap and the elastic stiffener; and an outer cover enclosing the inner cover.

7. The apparatus of claim 6, wherein the outer cover and the inner cover are made of a resilient material.

8. The apparatus of claim 7, wherein the resilient material is rubber.

9. The apparatus of claim 1, wherein the second platform further comprises a pair of support arms adapted to releasably engage each end of the second flexible strap.

10. The apparatus of claim 9, wherein the support arms have a plurality of apertures and the second flexible strap has a spring clip at each end engaging a selected one of the plurality of apertures, thereby being adjustable for varying tree trunk diameters.

11. The apparatus of claim 1, wherein the first platform further comprises a pair of boot straps attached thereto.

12. The apparatus of claim 1, wherein the second platform further comprises a padded back rest and a padded seat.

13. The apparatus of claim 1, wherein the second platform further comprises a padded shelf upon which the user sits while ascending the tree.

14. The apparatus of claim 1, further comprising a cam strap attached to the second platform, the cam strap being adjustable to securely hold the second platform against the tree trunk.

15. The apparatus of claim 1, further comprising backpacking straps attached to one of the first platform and second platform to allow the user to carry the apparatus on his back.

16. A tree climbing apparatus comprising:
   a) a first platform adapted to engage the tree trunk while the user is standing thereon, and movable along the tree trunk while the user is not standing thereon, the first platform having a first flexible, self-straightening strap removably attachable thereto, the first flexible, self-straightening strap having a non-scratching surface that does not scratch the tree trunk while in use; and
   b) a second platform adapted to engage the tree trunk while the user is sitting thereon, and movable along the tree trunk while the user is not sitting thereon, the second platform having a second self-straightening, flexible strap removably attachable thereto, the second self-straigtening, flexible strap having a non-scratching surface that does not scratch the tree trunk while in use;
   c) wherein the first self-straightening, flexible strap and the second self-straightening, flexible strap each further comprises a tough, flexible inner strap; an elastic stiffener; an inner cover enclosing the flexible inner strap and the elastic stiffener; and an outer cover enclosing the inner cover; and
   d) wherein the platform further comprises a pair of support arms adapted to releasably engage each end of the first self-straightening, flexible strap, wherein the support arms have a plurality of apertures and the first self-straightening, flexible strap has a spring clip at each end engaging a selected one of the plurality of apertures, thereby being adjustable for varying tree trunk diameters.

17. The apparatus of claim 16, wherein the second platform further comprises a pair of support arms adapted to releasably engage each end of the second self-straightening, flexible strap.

18. The apparatus of claim 17, wherein the support arms have a plurality of apertures and the second self-straightening, flexible strap has a spring clip at each end engaging a selected one of the plurality of apertures, thereby being adjustable for varying tree trunk diameters.

* * * * *